(12) United States Patent
Uozumi (10) Patent No.: US 9,322,675 B2
(45) Date of Patent: Apr. 26, 2016

(54) ABSOLUTE ENCODER AND METHOD OF OBTAINING ABSOLUTE POSITION BY A PLURALITY OF QUANTIZED DATA BASED ON A PLURALITY OF EXTREMA

(71) Applicant: CANON KABUSHIKI KAISHA, Tokyo (JP)

(72) Inventor: Takayuki Uozumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 229 days.

(21) Appl. No.: 14/064,348

(22) Filed: Oct. 28, 2013

(65) Prior Publication Data

US 2014/0145071 A1    May 29, 2014

(30) Foreign Application Priority Data

Nov. 29, 2012 (JP) .................................. 2012-261623

(51) Int. Cl.
*G01D 5/347* (2006.01)
*G01D 5/245* (2006.01)

(52) U.S. Cl.
CPC .......... *G01D 5/34776* (2013.01); *G01D 5/2455* (2013.01); *G01D 5/34792* (2013.01)

(58) Field of Classification Search
CPC ....................... G01D 5/34776; G01D 5/34792
See application file for complete search history.

(56) References Cited

U.S. PATENT DOCUMENTS

| | | | |
|---|---|---|---|
| 2010/0072348 A1* | 3/2010 | Takahashi | 250/206.1 |
| 2012/0032068 A1* | 2/2012 | Ishizuka | 250/231.1 |

FOREIGN PATENT DOCUMENTS

JP        2012-037392 A      2/2012

* cited by examiner

*Primary Examiner* — Francis M Legasse, Jr.
(74) *Attorney, Agent, or Firm* — Rossi, Kimms & McDowell LLP (57) ABSTRACT

An absolute encoder includes a scale having marks, a detector for detecting light modulated by some of the marks, and a processor. The marks include a first mark and at least two types of second marks. The first marks and the second marks are alternately arrayed. The processor specifies a signal range of a plurality of periods of output signals based on extrema of the output signals, obtains a data seq constituted by a plurality of quantized data based on based on a plurality of extrema, corresponding to the second marks, of the output signals within the signal range, obtains a phase based on periodic signals of the output signals within the signal range, and outputs data representing the absolute position based on the data sequence and the phase.

10 Claims, 7 Drawing Sheets

| T=t1 | REGISTER 51 OUTPUT VALUE | REGISTER 52 LOCAL MINIMUM VALUE | REGISTER 53 LOCAL MINIMUM VALUE POSITION | REGISTER 54 LOCAL MAXIMUM VALUE | REGISTER 55 LOCAL MAXIMUM VALUE POSITION | REGISTER 56 CALCULATION RANGE OUTPUT VALUE |
|---|---|---|---|---|---|---|
| 1 | VCh1 | | | | | |
| ⋮ | ⋮ | | | | | |
| N | | | | | | |

| T=t2 | REGISTER 51 | REGISTER 52 | REGISTER 53 | REGISTER 54 | REGISTER 55 | REGISTER 56 |
|---|---|---|---|---|---|---|
| 1 | VCh1 | | | | | |
| 2 | VCh2 | | | | | |
| ⋮ | ⋮ | | | | | |
| N | | | | | | |

| T=t8 | REGISTER 51 | REGISTER 52 | REGISTER 53 | REGISTER 54 | REGISTER 55 | REGISTER 56 |
|---|---|---|---|---|---|---|
| 1 | VCh1 | VCh7 | Ch7 | VCh7 | Ch7 | |
| 2 | VCh2 | | | | | |
| ⋮ | ⋮ | | | | | |
| 8 | VCh8 | | | | | |
| ⋮ | ⋮ | | | | | |
| N | | | | | | |

| T=t14 | REGISTER 51 | REGISTER 52 | REGISTER 53 | REGISTER 54 | REGISTER 55 | REGISTER 56 |
|---|---|---|---|---|---|---|
| 1 | VCh1 | VCh7 | Ch7 | VCh13 | Ch13 | VCh7 |
| 2 | VCh2 | | | | | |
| ⋮ | ⋮ | | | | | |
| 14 | VCh14 | | | | | |
| ⋮ | ⋮ | | | | | |
| N | | | | | | |

ABSOLUTE ENCODER AND METHOD OF OBTAINING ABSOLUTE POSITION BY A PLURALITY OF QUANTIZED DATA BASED ON A PLURALITY OF EXTREMA

BACKGROUND OF THE INVENTION

1. Field of the Invention

The present invention relates to an absolute encoder and a method of obtaining an absolute position.

2. Description of the Related Art

Conventionally, an incremental encoder or absolute encoder has been used to measure a position and angle. Incremental encoders record gratings at a given period (pitch) in a scale or disk, optically or magnetically read the movement of the gratings, and obtain a grating movement count, thereby outputting relative position information. Some incremental encoders output an absolute position in combination with an origin detection mechanism, in addition to relative position information. Some known method interpolates phase information obtained by dividing unit grating movement into 1,000 or more sections and outputs the interpolated phase information in order to improve the resolution of position information. Another known method cancels manufacturing variations in gratings by simultaneously reading a plurality of gratings instead of reading gratings one by one, and averaging them. As described above, the incremental encoders can output high resolution position information with high accuracy by interpolating phase information, and reading and averaging gratings. However, the incremental encoders require an origin detection process to obtain absolute position information, as described above. It is, therefore, necessary to perform origin detection upon power-on, resulting in disadvantage from the viewpoint of usability (productivity). Also, the incremental encoders are inappropriate for applications which require security assurance.

On the other hand, absolute encoders can output absolute position information by reading a binary pattern such as an M-sequence code using a light-receiving element array. Japanese Patent Laid-Open No. 2012-37392 discloses an absolute encoder which irradiates a relatively movable scale with a light beam emitted by a point light source, and receives light (transmitted light or reflected light) via the scale by a light-receiving element array. The absolute encoder disclosed in Japanese Patent Laid-Open No. 2012-37392 receives periodic signals having a light amount distribution of 11 periods by 12 light-receiving elements, respectively. The absolute encoder then acquires absolute position information by reading the amplitude of each periodic signal, and acquires phase information (interpolation information) at as high resolution as an incremental encoder by obtaining the phase of each periodic signal.

The absolute encoder disclosed in Japanese Patent Laid-Open No. 2012-37392 can measure an absolute position at as high resolution as an incremental encoder. However, in the absolute encoder disclosed in Japanese Patent Laid-Open No. 2012-37392, the processing time is long since the periodic signals obtained by the light-receiving element array need to be normalized to perform interpolation processing.

SUMMARY OF THE INVENTION

The present invention provides, for example, an absolute encoder advantageous in terms of a signal processing speed therein.

The present invention in the first aspect provides an absolute encoder including a scale on which a plurality of marks are arrayed at a first pitch, a detector which includes a plurality of photoelectric conversion elements disposed at a second pitch smaller than the first pitch and configured to detect light modulated by a predetermined number of marks of the plurality of marks, and a processor configured to obtain an absolute position of the detector or the scale based on output signals from the plurality of photoelectric conversion elements, wherein the plurality of marks include a first mark, a transmittance value or reflectance value of which falls within a first range, and at least two types of a second mark, transmittance values or reflectance values of which fall within a second range different from the first range and are different from each other, the first marks and the second marks are alternately arrayed, and wherein the processor is configured to specify a signal range of a plurality of periods of the output signals based on extrema of the output signals, obtain a data sequence constituted by a plurality of quantized data based on a plurality of extrema, corresponding to the second marks, of the output signals within the signal range, obtain a phase based on periodic signals of the output signals within the signal range, and output data representing the absolute position based on the data sequence and the phase.

The present invention in the second aspect provides a method of obtaining an absolute position of a detector or scale, a plurality of marks being arrayed at a first pitch on the scale, the detector including a plurality of photoelectric conversion elements disposed at a second pitch smaller than the first pitch and being configured to detect light modulated by a predetermined number of marks of the plurality of marks, and the absolute position being obtained based on output signals from the plurality of photoelectric conversion elements, wherein the plurality of marks include a first mark, a transmittance value or reflectance value of which falls within a first range, and at least two types of a second mark, transmittance values or reflectance values of which fall within a second range different from the first range and are different from each other, the first marks and the second marks are alternately arrayed, and wherein the method comprises specifying a signal range of a plurality of periods of the output signals based on extrema of the output signals, obtaining a data sequence constituted by a plurality of quantized data based on a plurality of extrema, corresponding to the second marks, of the output signals within the signal range, obtaining a phase based on periodic signals of the output signals within the signal range, and obtaining the absolute position based on the data sequence and the phase.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
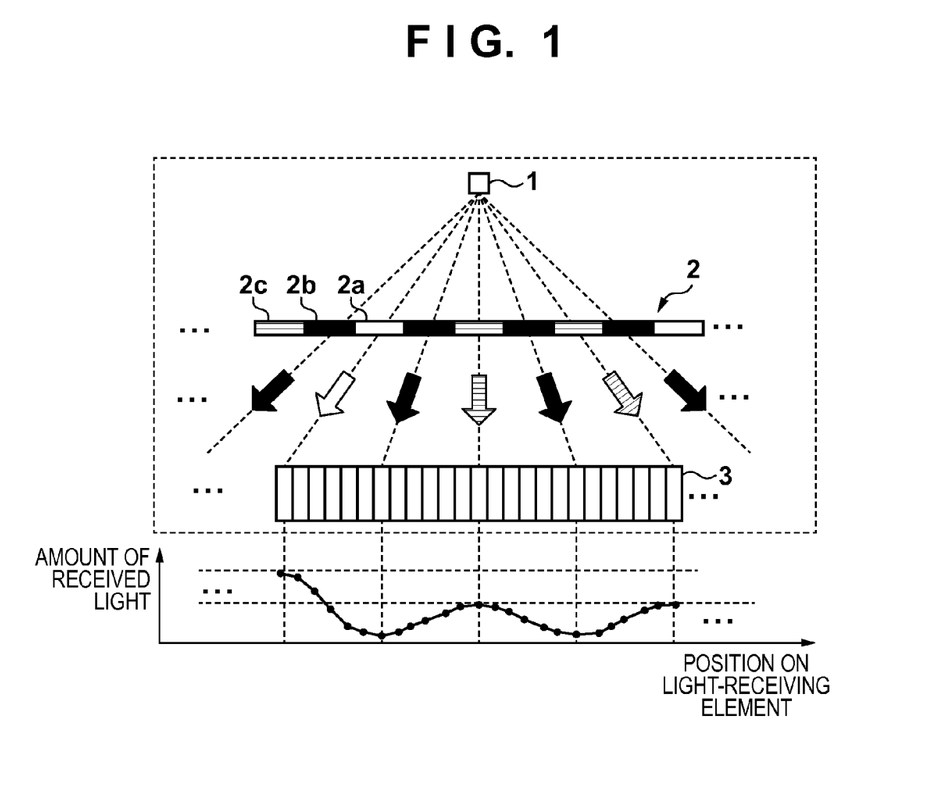
FIG. 1 is a view showing the arrangement of an absolute encoder according to the present invention.

FIG. 1 illustrates the arrangement of an absolute encoder according to the first embodiment of the present invention. As shown in FIG. 1, a relatively movable scale (or disk) 2 is irradiated with a divergent light beam emitted by a point light source 1 such as an LED, and a light-receiving element array (detector) 3 receives and detects transmitted light (modulated light) having transmitted through the scale 2. On the scale 2, an incremental pattern in which transmissive parts (second marks) 2a and non-transmissive parts (first marks) 2b are arrayed at a first pitch is formed. Some of the transmissive parts 2a are replaced by semi-transmissive parts (second marks) 2c.

On the scale 2, therefore, the non-transmissive parts (first marks) 2b are alternately arrayed, and one second mark (the transmissive part 2a or the semi-transmissive part 2c) is disposed between the adjacent non-transmissive parts (first marks) 2b. Absolute codes are embedded in the scale 2 by the positions of the transmissive parts 2a and semi-transmissive parts 2c (two types of second marks). In the first embodiment, the non-transmissive part 2b forms the first mark, the transmittance value of which falls within a first range. A value within the first range is smaller than the transmittance values (a second range) of the transmissive part 2a and semi-transmissive part 2c which form the second marks. Note that the transmittance values of the transmissive part 2a and semi-transmissive part 2c which form the second marks fall within the second range but are different from each other.

In the first embodiment, an M-sequence code defining the transmissive part 2a of the scale 2 as 1 and the semi-transmissive part 2c of the scale 2 as 0, or another cyclic code generated by a primitive polynomial can be used as an absolute code. The absolute code is a data sequence formed by data quantized based on signals corresponding to a plurality of second marks. A light beam having been transmitted through the scale 2 has sinusoidal periodicity as obtained by an incremental encoder, and has a light amount distribution in which the amplitude change reflects absolute code information.

FIG. 1 shows a light amount distribution on the light-receiving element array 3. The light-receiving element array 3 is formed by a CMOS or CCD. In the light-receiving element array 3, a plurality of light-receiving elements (photoelectric conversion elements) are disposed at a second pitch smaller than the first pitch. By determining the second pitch so as to divide, into N sections, a design value of one bright-dark period of the light amount distribution determined by the first pitch of the plurality of marks arrayed on the scale 2, the phases of signals output from the respective light-receiving elements shift from each other by equal intervals. For example, assume that the number M of bits of the absolute code is 10 and the division number N (the number of light-receiving elements) of the light-receiving element array for one period of the light amount distribution is 12. In this case, a light-receiving element array 3 including N×M=120 light-receiving elements acquires periodic signals having absolute code information.

The absolute encoder acquires temporary absolute position information (a data sequence formed by a plurality of quantized data) by reading the amplitudes of the periodic signals, whose change reflects the absolute code information. The absolute encoder then acquires interpolation information at as high resolution as an incremental encoder by obtaining the phases of the periodic signals.

Figure 2:
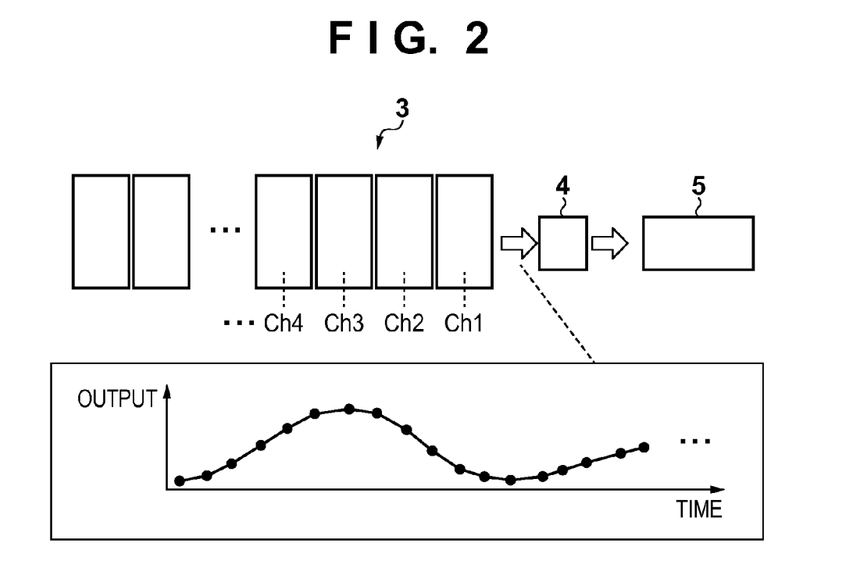
FIG. 2 is a view for explaining a procedure of storing output signals from a light-receiving element array in a register.

FIG. 2 illustrates a procedure of storing signals output from the light-receiving element array 3 in a register. Analog signals output from the serial-output type light-receiving element array 3 indicate analog voltage values reflecting the light amount distribution on the light-receiving element array 3. The analog signals are sequentially A/D converted by an A/D converter 4, and the thus obtained digital values are sequentially stored in a register 5 as waveform data. When sequentially acquiring the output values of the respective light-receiving elements of the light-receiving element array 3, a processor 6 compares each output value with the output values of the preceding and succeeding light-receiving elements, and records, in the register 5, local maximum and minimum values and the pieces of position information of the light-receiving elements in which the local maximum and minimum values are acquired.

In addition to the A/D converted voltage values output from the respective light-receiving elements of the light-receiving element array 3, the register 5 stores local maximum and minimum values, the pieces of position information of the light-receiving elements in which the local maximum and minimum values are acquired, and A/D converted voltage values representing a calculation range including a predetermined number of light-receiving elements. Note that the arrangement may be changed not to store, in the register 5, the A/D converted voltage values output from the respective light-receiving elements of the light-receiving element array 3.

Figure 3:
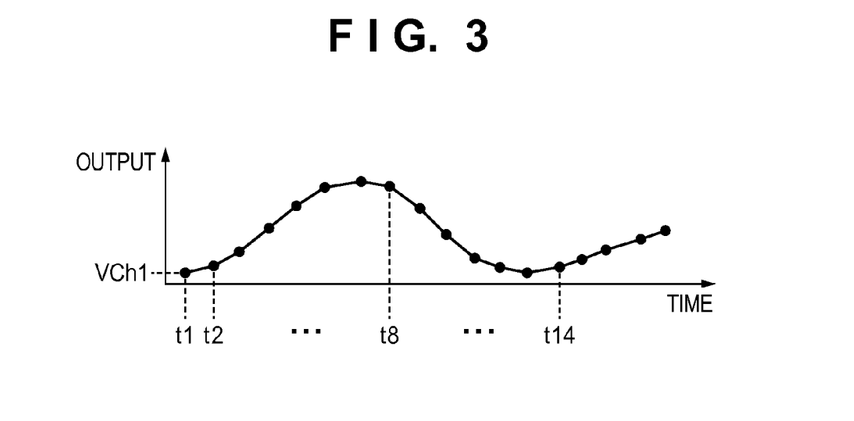
FIG. 3 is a timing chart showing an example of the waveform of the output signals from the light-receiving element array.
Figure 4:
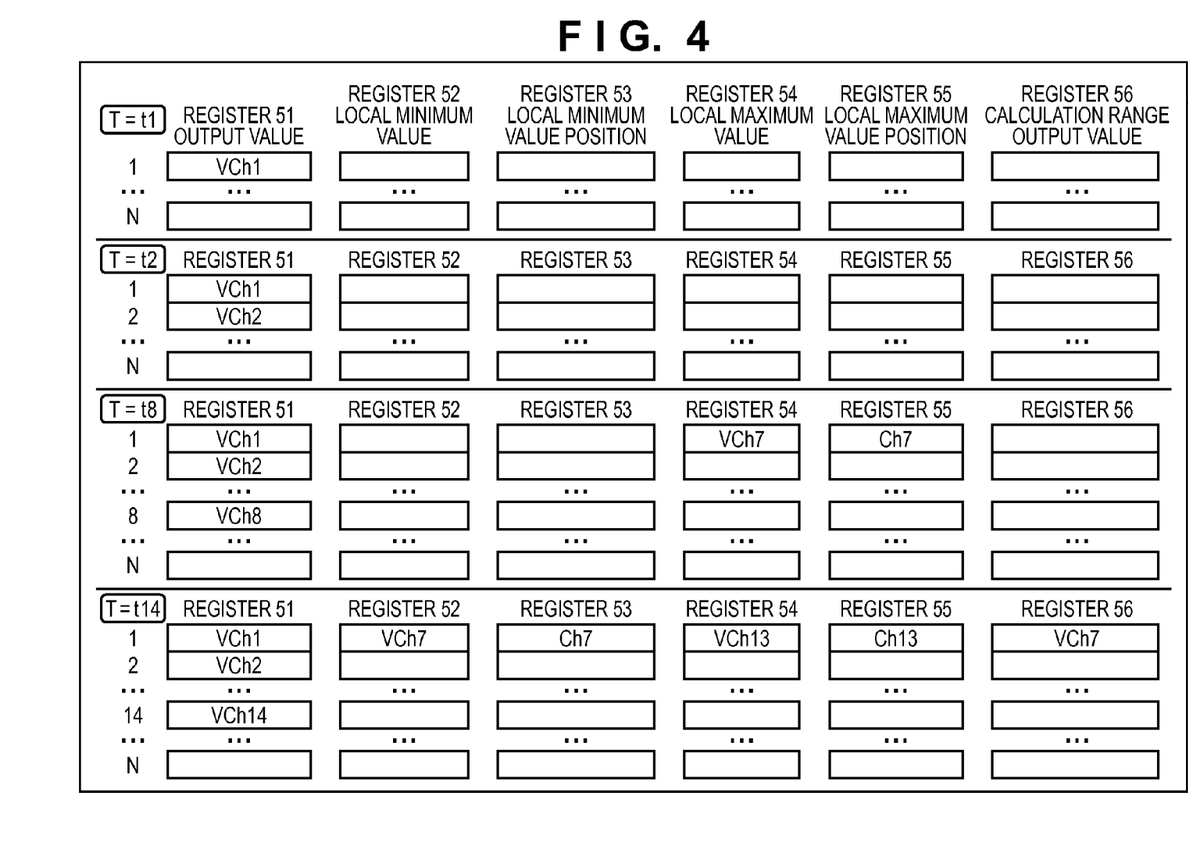
FIG. 4 is a view showing a case in which the output signals are stored in registers.

FIGS. 3 and 4 show a signal acquisition procedure according to the present invention. The analog signals output from the light-receiving element array 3 are sequentially A/D converted, and the output values of the respective light-receiving elements are sequentially output. The respective light-receiving elements of the light-receiving element array 3 are named as Ch1, Ch2, . . . . If the A/D converted output values are sequentially output from Ch1, signals shown in FIG. 3 are obtained as signals time-serially output.

A waveform shown in FIG. 3 undergoes the following processing, and is then stored in the register 5, as shown in FIG. 4. The output values which are sequentially output are stored in a register 51. At the same time, the processor 6 compares each output value with the output values of the preceding and succeeding elements, and determines whether the output value is a local minimum value or local maximum value. If it is determined that the output value is a local minimum value, the local minimum value is stored in a register 52. If the output value is a local maximum value, the local maximum value is stored in a register 54. At this time, the position of the light-receiving element from which the local minimum value or local maximum value is output is also stored in a register 53 or 55. Note that with respect to the light-receiving element Ch1, no output value information is available, and thus no extreme value determination is performed.

Referring to FIG. 4, VChi represents an output value from each light-receiving element, and Chi represents the position of the light-receiving element. Note that a number i indicates the position of a corresponding light-receiving element. The processor 6 specifies a signal range of a plurality of periods of signals output from light-receiving elements including a light-receiving element at the first end of the signal range in which the first local minimum value is obtained, a light-receiving element at the second end of the signal range, and a predetermined number of light-receiving elements between the first end and the second end, and records signals included within the signal range. The output values included in the specified signal range are stored in a register 56. For example, if the absolute code M=10 bits and the division number N=12 as described above, 24 light-receiving elements (corresponding to 2 bits of the absolute code) are additionally prepared. In this case, a local minimum value of the periodic signals always appears before the 12th light-receiving element, and it is therefore possible to ensure a sufficient light-receiving region for 120 light-receiving elements within the signal range.

Figure 5:
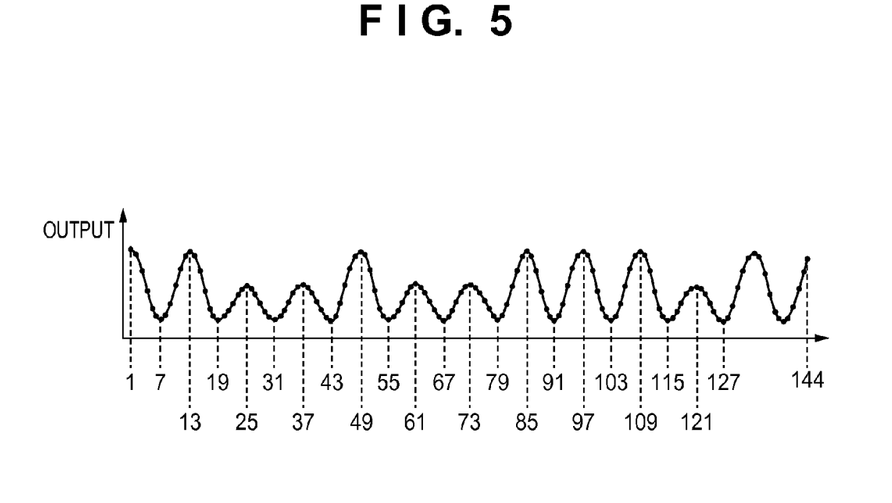
FIG. 5 is a timing chart showing an example of the waveform of the output signals from the light-receiving array.
Figure 6:
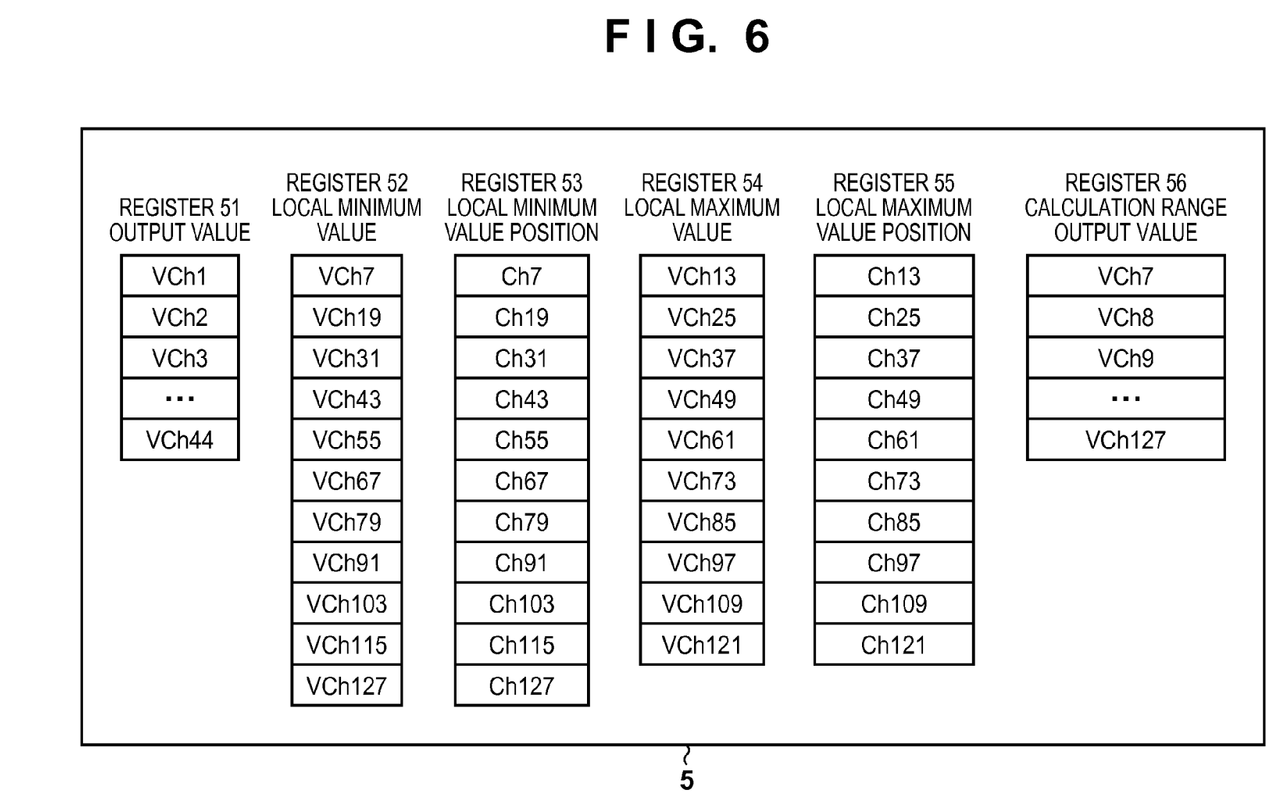
FIG. 6 is a view showing a case in which the output signals are stored in the registers.

FIG. 5 shows an example of output signals when the absolute code M=10 bits and the division number N=12, and shows the outputs of the respective light-receiving elements which reflect the light amount distribution on the light-receiving element array 3. FIG. 5 also shows pieces of position information of light-receiving elements in which local minimum values and local maximum values are acquired. FIG. 6 shows a state in which the output values that are sequentially output are stored in the register 5 according to the above-described procedure. The register 51 stores output values from all the 144 light-receiving elements. The registers 52 and 53 store 11 local minimum values and their pieces of position information, respectively. The registers 54 and 55 store 10 local maximum values and their pieces of position information, respectively. The register 56 stores output values from 121 light-receiving elements included within the signal range.

Figure 7:
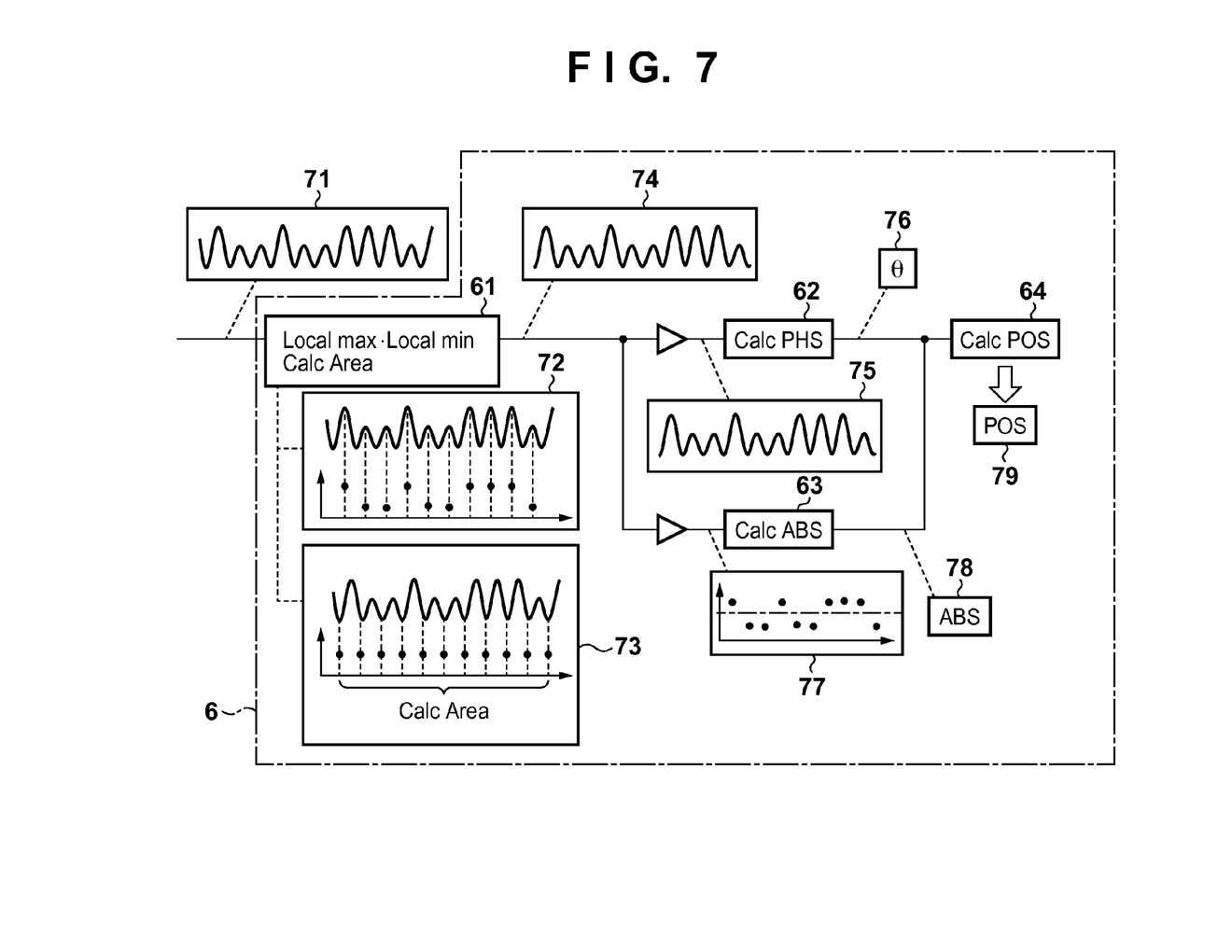
FIG. 7 is a view for explaining a signal processing method for the absolute encoder according to the present invention.

A calculation method by which the processor 6 calculates absolute position information 79 using the output values and pieces of position information stored in the register 5 will be described next. FIG. 7 is a view for explaining the procedure of the processor 6 when the output example shown in FIG. 5 is used. As described above, when A/D converting the 144 output values output from the light-receiving element array 3 and storing them in the register 5, an extreme value acquisition unit 61 acquires extreme value information 72, specifies a signal range 73, and acquires output value information 74 within the signal range. The processor 6 can simultaneously perform phase calculation and absolute code calculation.

Phase calculation will be explained first. A phase calculation unit 62 obtains phase information (interpolation information) using output value information 75 included within the specified signal range. The phase information can be obtained by, for example, a method similar to the method described in Japanese Patent Laid-Open No. 2012-37392. For example, four signals having the same period as the design value of the bright-dark period of an output signal, a constant amplitude, and phases which shift from each other by $\pi/4$ are used as four reference signals. The four reference signals can be represented by $\{(1-\sin \omega t)/2\}$, $\{(1-\cos \omega t)/2\}$, $\{(1+\sin \omega t)/2\}$, and $\{(1+\cos \omega t)/2\}$. Each of the four reference signals is multiplied by the output values 75, and the sum of the multiplication results is obtained, thereby obtaining A(+), B(+), A(−), and B(−). The difference between A(+) and A(−) and the difference between B(+) and B(−) are also obtained. Since the ratio between the differences indicates the tangent of a phase to be obtained, it is possible to obtain a phase 76 at as high resolution as an incremental encoder by obtaining the arc tangent of the ratio.

Absolute code calculation will be described next. An absolute code calculation unit 63 calculates an absolute code using local maximum value information 77 of the output values included within the signal range. The local maximum value information 77 of the output values is stored in the register 54 shown in FIG. 6. The absolute code calculation unit 63 obtains an absolute code by performing threshold determination and binarization for the values. The graph 77 of FIG. 7 schematically shows the local maximum values of the output values included within the signal range. If the local maximum values are binarized using a threshold indicated by a one-dot dashed line in the graph 77, an absolute code "1001001110" is obtained. It is possible to obtain temporary absolute position information 78 corresponding to the obtained absolute code by, for example, a method of referring to a lookup table.

As described above, the processor 6 can simultaneously calculate a phase and an absolute code by simultaneously storing, in the register 5, the information 72 concerning extreme values and extreme value acquisition positions and the information 73 concerning the output values representing the signal range based on outputs 71 from the respective light-receiving elements of the light-receiving element array 3. The phase calculation unit 62 shown in FIG. 7 outputs the phase information 76, and the absolute code calculation unit 63 shown in FIG. 7 outputs the temporary absolute position information 78. An absolute position information calculation unit 64 combines the phase information 76 with the temporary absolute position information 78, and then outputs the absolute position information 79 with high accuracy. The output absolute position information 79 is stored in the register 5, and serially output, as needed.

The absolute encoder having the aforementioned arrangement can perform interpolation with as high accuracy as an incremental encoder. Since phase calculation and absolute code calculation can be simultaneously performed, the signal processing time can be shortened.

Other Embodiments

The present invention is not limited to the first embodiment, and various changes and modifications can be made within the spirit and scope of the present invention. Although some of transmissive parts forming the incremental pattern are replaced by semi-transmissive parts in the first embodiment, some of non-transmissive parts may be replaced by semi-transmissive parts. That is, first marks which are alternately arrayed on a scale 2 can be set as transmissive parts, and the transmittance value (first range) of the first mark can be made larger than the transmittance value (second range) of a non-transmissive part or semi-transmissive part disposed as a second mark between the adjacent transmissive parts. Although three types of marks having different transmittance values are disposed on the scale in the first embodiment, three types of marks having different reflectance values may be disposed on a scale.

In the first embodiment, an enlarging illumination optical system using divergent light is used as the optical system of the encoder. However, an imaging optical system or an optical system for emitting parallel light by inserting an optical element between a point light source 1 and the scale 2 may be used. To store an output value in a register, the sum of output values output from a predetermined number of light-receiving elements before and after a corresponding light-receiving element of a light-receiving element array 3 may be stored.

In the first embodiment, one of two signals respectively defining the two ends of the signal range is determined based on signals output from light-receiving elements, and the other signal is determined by counting a predetermined number of signals from the acquired signal. However, the two signals respectively defining the two ends of the signal range may be determined based on signals output from light-receiving elements.

Figure 8A:
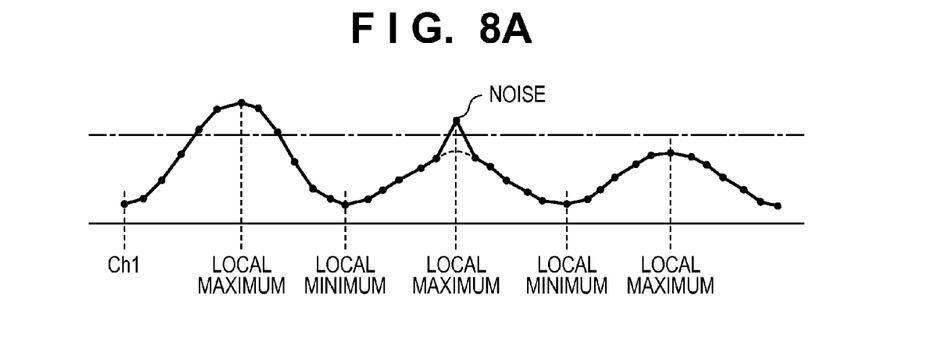
FIGS. 8A and 8B are views each showing a case in which noise is superimposed on output signals.

FIG. 8A is a view showing a signal in which noise occurs at an extreme value to make a local maximum value larger. A threshold used as a reference for binarization when determining an absolute code based on a local maximum value is indicated by a one-dot dashed line in FIG. 8A. The signal shown in FIG. 8A may be unwantedly output when, for example, dirt is attached on the scale, the scale is damaged, or electrical noise occurs. If such noise occurs, it is possible to correctly acquire extreme values but an absolute code is erroneously determined based on a local maximum value. At this time, for example, it is possible to reduce the influence of the noise by an averaging (smoothing) effect by acquiring, for each light-receiving element, a signal of the sum (or average) of outputs of the light-receiving element and neighboring light-receiving elements (that is, by smoothing output signals), thereby preventing erroneous determination.

Figure 8B:
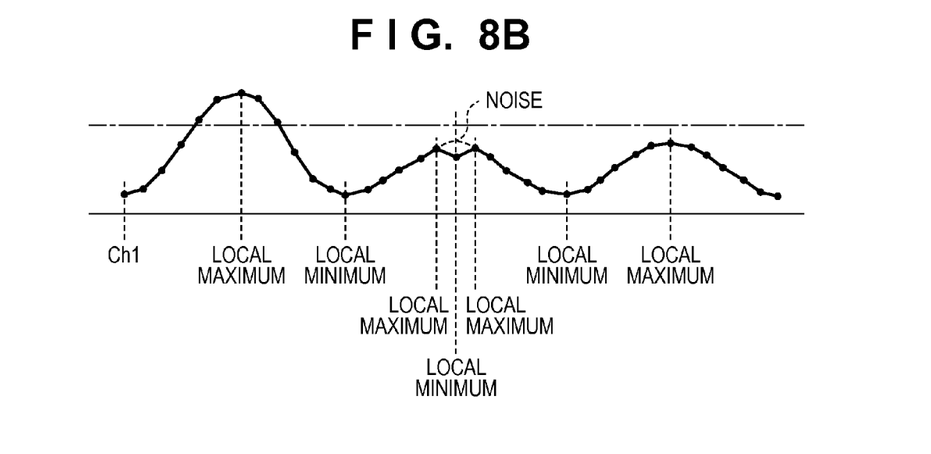

FIG. 8B is a view showing a signal in which noise occurs at an extreme value to make a local maximum value smaller. If such noise occurs, no output value exceeding the threshold which causes erroneous determination of an absolute code based on the local maximum value appears. When acquiring extreme values, however, erroneous extreme values are additionally acquired, as shown in FIG. 8B. Even if such noise occurs, it is possible to reduce the influence of the noise by an averaging effect by obtaining the sum of output values of a predetermined number of light-receiving elements, as described above. It is, therefore, possible to acquire desired extreme values, and correctly determine an absolute code.

Figure 9:
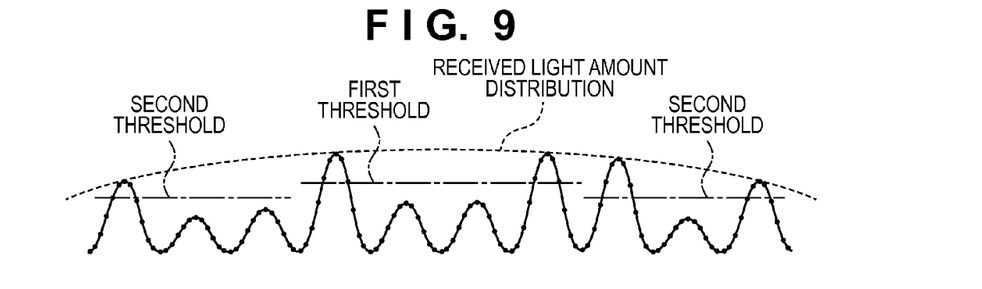
FIG. 9 is a view showing a case in which a light amount distribution is large.

If the light-receiving element array 3 has the received light amount distribution of modulated light, the influence of the received light amount distribution may not be negligible. FIG. 9 is a view showing signals when a variation in received light amount is large. If a variation in received light amount is large, the signals conform to an envelope indicated by a dotted line. FIG. 9 shows two different thresholds (first threshold and second threshold). If an absolute code is determined using only the first threshold, determination of the first and 10th bits which are away from the center of the light-receiving element array 3 has low robustness. Based on the design value information and experimental value information of an optical system, the degree of variation in received light amount can be determined in advance. Using these pieces of information makes it possible to prepare different thresholds for the central portion and edge portion of the light-receiving element array 3, as shown in FIG. 9. The present invention is not limited to the two different thresholds as shown in FIG. 9, and a larger number of thresholds may be prepared, as a matter of course. As described above, setting a plurality of different thresholds allows absolute code determination with high robustness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261623 filed Nov. 29, 2012, which is hereby incorporated by reference herein in its entirety.

What is claimed is:

1. An absolute encoder comprising a scale on which a plurality of marks are arrayed at a first pitch, a detector which includes a plurality of photoelectric conversion elements disposed at a second pitch smaller than a third pitch corresponding to the first pitch thereon and configured to detect light modulated by a predetermined number of marks of the plurality of marks, and a processor configured to obtain an absolute position of the detector or the scale based on output signals from the plurality of photoelectric conversion elements, wherein the plurality of marks include a first mark, a transmittance value or reflectance value of which falls within a first range, and at least two types of a second mark, transmittance values or reflectance values of which fall within a second range different from the first range and are different from each other, the first marks and the second marks are alternately arrayed, and wherein the processor is configured to specify a signal range of a plurality of periods of the output signals based on extrema of the output signals, obtain a data sequence constituted by a plurality of quantized data based on a plurality of extrema, corresponding to the second marks, of the output signals within the specified signal range, obtain a phase of periodic signals of the output signals within the specified signal range, and obtain data representing the absolute position based on the data sequence and the phase.

2. The encoder according to claim 1, wherein
the processor is configured to specify two signals respectively defining two ends of the specified signal range based on the extrema.

3. The encoder according to claim 1, wherein
the processor is configured to specify one of two signals respectively defining two ends of the specified signal range based on the extrema, and to specify the other of the two signals based on the specified one of the two signals.

4. The encoder according to claim 1, wherein
a value within the first range is smaller than a value within the second range, an extremum of a signal corresponding to the first mark is a local minimum, and an extremum of a signal corresponding to the second mark is a local maximum.

5. The encoder according to claim 1, wherein
a value within the first range is larger than a value within the second range, an extremum of a signal corresponding to the first mark is a local maximum, and an extremum of a signal corresponding to the second mark is a local minimum.

6. The encoder according to claim 1, wherein
the processor is configured to obtain, as the output signals, signals obtained by smoothing outputs of the detector.

7. The encoder according to claim 1, wherein
the processor is configured to quantize the plurality of extrema based on a plurality of thresholds.

8. The encoder according to claim 1, wherein
the plurality of marks include at least three types of marks having respective transmittance values different from one another, and the detector is configured to detect light having been transmitted through the predetermined number of marks.

9. The encoder according to claim 1, wherein
the plurality of marks include at least three types of marks having respective reflectance values different from one another, and the detector is configured to detect light having been reflected by the predetermined number of marks.

10. A method of obtaining an absolute position of a detector or scale, a plurality of marks being arrayed at a first pitch on the scale, the detector including a plurality of photoelectric conversion elements disposed at a second pitch smaller than a third pitch corresponding to the first pitch thereon and being configured to detect light modulated by a predetermined number of marks of the plurality of marks, and the absolute position being obtained based on output signals from the plurality of photoelectric conversion elements,     wherein the plurality of marks include a first mark, a transmittance value or reflectance value of which falls within a first range, and at least two types of a second mark, transmittance values or reflectance values of which fall within a second range different from the first range and are different from each other, the first marks and the second marks are alternately arrayed, and     wherein the method comprises steps of:

specifying a signal range of a plurality of periods of the output signals based on extrema of the output signals,     obtaining a data sequence constituted by a plurality of quantized data based on a plurality of extrema, corresponding to the second marks, of the output signals within the specified signal range,     obtaining a phase of periodic signals of the output signals within the specified signal range, and     obtaining the absolute position based on the data sequence and the phase.

* * * * *